(12) United States Patent
Kurts et al.

(10) Patent No.: US 7,529,955 B2
(45) Date of Patent: May 5, 2009

(54) DYNAMIC BUS PARKING

(75) Inventors: Tsvika Kurts, Haifa (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 415 days.

(21) Appl. No.: 11/172,110

(22) Filed: Jun. 30, 2005

(65) Prior Publication Data

US 2007/0006004 A1    Jan. 4, 2007

(51) Int. Cl.
G06F 1/00 (2006.01)
G06F 1/32 (2006.01)
G06F 13/36 (2006.01)

(52) U.S. Cl. .................. 713/320; 713/300; 713/323; 713/324; 710/113; 710/119; 710/309

(58) Field of Classification Search .......... 713/320, 713/300, 323, 324; 710/113, 119, 309
See application file for complete search history.

(56) References Cited

U.S. PATENT DOCUMENTS

| | | | |
|---|---|---|---|
| 4,862,348 A | 8/1989 | Nakamura | |
| 5,396,635 A | 3/1995 | Fung | |
| 5,404,546 A | 4/1995 | Stewart | |
| 5,432,944 A | 7/1995 | Nuckolls et al. | |
| 5,737,746 A | 4/1998 | Hardin et al. | |
| 5,744,944 A | 4/1998 | Danstrom | |
| 5,758,133 A * | 5/1998 | Evoy ................ | 713/501 |
| 5,808,455 A | 9/1998 | Schwartz et al. | |
| 5,819,027 A | 10/1998 | Budelman et al. | |
| 5,915,121 A | 6/1999 | Wagner | |
| 5,945,817 A | 8/1999 | Nguyen | |
| 5,953,215 A * | 9/1999 | Karabatsos ........... | 361/767 |
| 6,057,675 A | 5/2000 | Tateishi | |
| 6,058,059 A | 5/2000 | Huang et al. | |
| 6,157,206 A | 12/2000 | Taylor et al. | |
| 6,249,111 B1 | 6/2001 | Nguyen | |
| 6,300,789 B1 | 10/2001 | Ball | |
| 6,330,679 B1 | 12/2001 | Conary et al. | |
| 6,339,552 B1 | 1/2002 | Taruishi et al. | |
| 6,356,105 B1 | 3/2002 | Volk | |
| 6,369,557 B1 | 4/2002 | Agiman | |
| RE37,708 E | 5/2002 | Danstrom | |

(Continued)

FOREIGN PATENT DOCUMENTS

EP    1001606    5/2000

OTHER PUBLICATIONS

Intel Pentium 4 Processor with 512-KB L2 Cache on 0.13 Micron Process Datasheet, "Features", Jun. 2003, pp. 65-68.

(Continued)

*Primary Examiner*—Thomas Lee
*Assistant Examiner*—Michael J Brown
(74) *Attorney, Agent, or Firm*—Blakely, Sokoloff, Taylor & Zafman LLP

(57) ABSTRACT

Systems and methods of power management provide for issuing a power saving message from a processor toward a controller and using the controller to conduct a power saving activity in response to the power saving message. In one embodiment, the power saving message is issued by de-asserting a bus arbitration signal and the power saving activity can include disabling one or more input buffers of the controller.

30 Claims, 4 Drawing Sheets

U.S. PATENT DOCUMENTS

| | | | |
|---|---|---|---|
| 6,396,252 B1 | 5/2002 | Culpepper et al. | |
| 6,424,170 B1 | 7/2002 | Raman et al. | |
| 6,456,049 B2 | 9/2002 | Tsuji | |
| 6,541,947 B1 | 4/2003 | Dittmer et al. | |
| 6,548,991 B1 | 4/2003 | Maksimovie et al. | |
| 6,573,747 B2 | 6/2003 | Radhakrishnan | |
| 6,597,626 B2 | 7/2003 | Hirabayashi | |
| 6,633,987 B2* | 10/2003 | Jain et al. | 713/300 |
| 6,643,792 B1 | 11/2003 | Kurosawa | |
| 6,693,412 B2 | 2/2004 | Ruan et al. | |
| 6,795,665 B2* | 9/2004 | Miura | 399/90 |
| 6,842,035 B2 | 1/2005 | Kurts et al. | |
| 7,069,189 B2 | 6/2006 | Rotem | |
| 7,130,936 B1* | 10/2006 | Baines et al. | 710/53 |
| 7,152,167 B2 | 12/2006 | Kurts et al. | |
| 7,216,240 B2 | 5/2007 | Kurts et al. | |
| 2001/0037421 A1 | 11/2001 | Singh et al. | |
| 2003/0131125 A1 | 7/2003 | Ooi | |
| 2003/0229821 A1* | 12/2003 | Ma | 714/8 |
| 2005/0083095 A1 | 4/2005 | Kurts et al. | |
| 2006/0143485 A1 | 6/2006 | Naveh et al. | |

OTHER PUBLICATIONS

"PCT/US2006/025956 International Search Report and Written Opinion", (Nov. 9, 2006).

Orenstien, Doron, et al., "An Apparatus and Method for Address Bus Power Control", U.S. Appl. No. 10/436,903, filed May 12, 2003.

* cited by examiner

DYNAMIC BUS PARKING

CROSS REFERENCE TO RELATED APPLICATIONS

The present application is related to U.S. patent application Ser. No. 10/317,798, filed on Dec. 11, 2002; U.S. patent application Ser. No. 10/317,776, filed on Dec. 11, 2002; U.S. patent application Ser. No. 10/931,565, filed on Aug. 31, 2004; U.S. patent application Ser. No. 10/442,595, filed on May 21, 2003; and U.S. Pat. No. 6,842,035, issued on Jan. 11, 2005.

BACKGROUND

1. Technical Field

Certain embodiments of the present invention generally relate to power management. In particular, some embodiments relate to platform level power management.

2. Discussion

As the components of modern day computing systems continue to grow in functionality and computing form factors continue to decrease in size, computer designers and manufacturers are often faced with significant challenges related to increased power consumption. As a result, a number of techniques have been developed to reduce power consumption. For example, some approaches involve powering down system components when their functionality is not needed. While these solutions can be suitable under certain circumstances, there remains considerable room for improvement.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
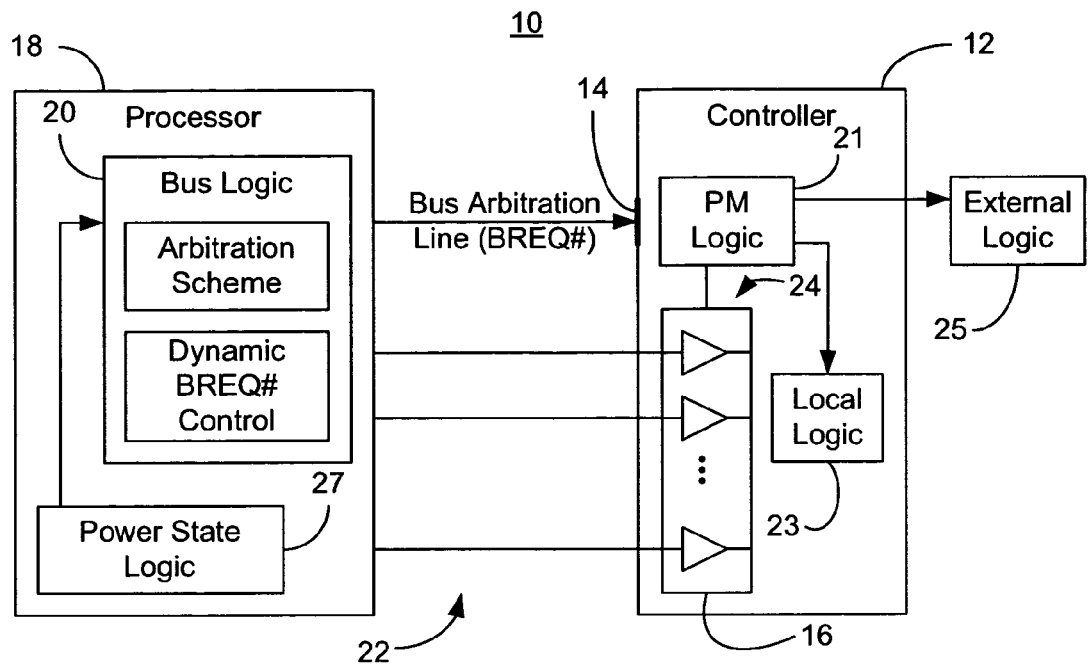
FIG. 1 is a block diagram of an example of an apparatus according to one embodiment.

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Some portions of the detailed description, which follow, may be presented in terms of algorithms and symbolic representations of operations on data bits or binary digital signals within a computer memory. These algorithmic descriptions and representations may be the techniques used by those skilled in the data processing arts to convey the substance of their work to others skilled in the art. For example, certain logic described herein may be implemented using hardware techniques such as complementary metal oxide semiconductor (CMOS) technology or transistor-transistor logic (TTL), controller firmware, microcode, software techniques, and any combination thereof. The components described herein may also be incorporated into one or more integrated circuit (IC) packages (i.e., chips) which are fabricated on a die cut from a wafer.

Any use of the terms "first", "second", etc. does not necessarily infer a chronological relationship, and is used to facilitate discussion only. Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Furthermore, terms such as "coupled" or "coupling" can be used to refer to any connection, direct or indirect, between the components in question and can involve a mechanical, electrical, optical, electromagnetic, or other type of relationship.

As used herein, the term "transaction" designates a bus activity that is related to a single bus access request. A transaction may include several phases, where each phase is associated with a specific set of bus signals to communicate a particular type of information. For one embodiment, exemplary phases may include, for example, an arbitration phase, a request phase, a snoop phase, a response phase and/or a data phase.

In the request phase, the requesting agent can drive request control and address information on the bus. During a subsequent snoop phase, it may be determined, whether sought after data is stored locally and/or whether the transaction is likely to be completed in order with respect to previously issued transactions. In a response phase, a response agent can report to the requesting agent information indicating whether the requested transaction has succeeded or failed. If the requested transaction includes data transfer, a data phase, also referred to as a data transfer phase, may be initiated in response to the assertion of a data ready signal.

FIG. 1 shows an apparatus 10 having a controller 12 and a processor 18. The processor 18 and the controller 12 may communicate with one another over a bus 22, where in one example the bus 22 may be a pipelined front side bus (FSB) that includes address, data and control portions. The address, data and control portions may also be referred to as address, data and control buses. In another example, the bus 22 may be part of a point-to-point interconnection fabric that enables direct communication among multiple components of a computing system. The illustrated controller 12, which may be part of a graphic model and memory controller hub (GMCH), commonly used on computing system chipsets, has a power saving message line input 14 and power management logic 21. The controller 12 may also include one or more input buffers 16 coupled to the bus 22 and the power management logic 21, local logic 23 coupled to the power management logic 21, and external logic 25 coupled to the power management logic 21.

The illustrated input buffer 16 has a plurality of sense amplifiers 24 that may consume a significant amount of power when enabled for receiving data. The illustrated local logic 23 may include internal components such as functional blocks for performing the various operations provided by the controller 12. For example, the local logic 23 could conduct memory or input/output (IO) management operations. The illustrated external logic 25 could include external components such as one or more memory device (e.g., system memory) functional blocks, where the external logic 25 may be managed by the controller 12. The illustrated local logic 23 and external logic 25 may also consume a significant amount of power when enabled for operation.

The processor 18 can have power state logic 27 and bus logic 20, which may also be referred to as a bus agent, capable of issuing a power saving message to the controller 12. The illustrated power management logic 21 of the controller 12 is able to conduct a power saving activity in response to the power saving message. The power saving message may be conveyed in a number of different ways. For example, in the illustrated example, the processor uses a bus arbitration line to communicate the power saving message to the controller 12.

In particular, the illustrated bus logic 20 asserts a bus arbitration signal toward the line input 14 whenever the processor needs to communicate with the controller 12 over the bus 22. In the illustrated example, the bus arbitration signal is identified as the "BREQ#" signal. For the purposes of this discussion, a "#" at the end of a signal name indicates that the associated signal is an active low signal (i.e., considered to be asserted when it drives a logic low level on the external bus). It will be appreciated that active high signals may be used instead with corresponding changes in associated circuitry to provide similar functionality. Further, for one embodiment, one or more of the signals associated with the bus 22 are low voltage swing signals that have a voltage swing smaller than full swing. It can also be understood that the bus arbitration signal may be an encoded message rather than the physical signal BREQ#.

The bus logic 20 is also able to de-assert the bus arbitration signal in order to instruct the controller 12 to conduct the power saving activity. The power saving activity may involve disabling one or more internal components of the controller 12 and/or disabling one or more external components that are managed by the controller 12. For example, the disabled internal components could include the sense amplifiers 24 of the input buffer 16, the local logic 23, and so on. Similarly, the disabled external components could include the external logic 25, where conducting the power saving activity may involve placing a system dynamic random access memory (DRAM) into a power down state (e.g., self refresh) if the controller 12 is a memory controller. The power management logic 21 of the controller 12 can therefore detect the de-assertion of the bus arbitration signal and conduct various power saving activities in response to detecting the de-assertion.

In the case of the disabling of the input buffer 16, the bus 22 can be said to be dynamically "parked" from the perspective of the controller 12. Accordingly, by enabling the processor 18 to selectively conduct power saving activities such as disabling the input buffer 16 of the controller 12, the bus logic 20 provides substantial power savings over conventional approaches. These power savings can lead to greater battery life in mobile platforms as well as reduced temperatures. In fact, extending the power features of the bus 22 to the controller 12 side of the bus 22, represents a significant advantage over conventional power management architectures.

Figure 2A:
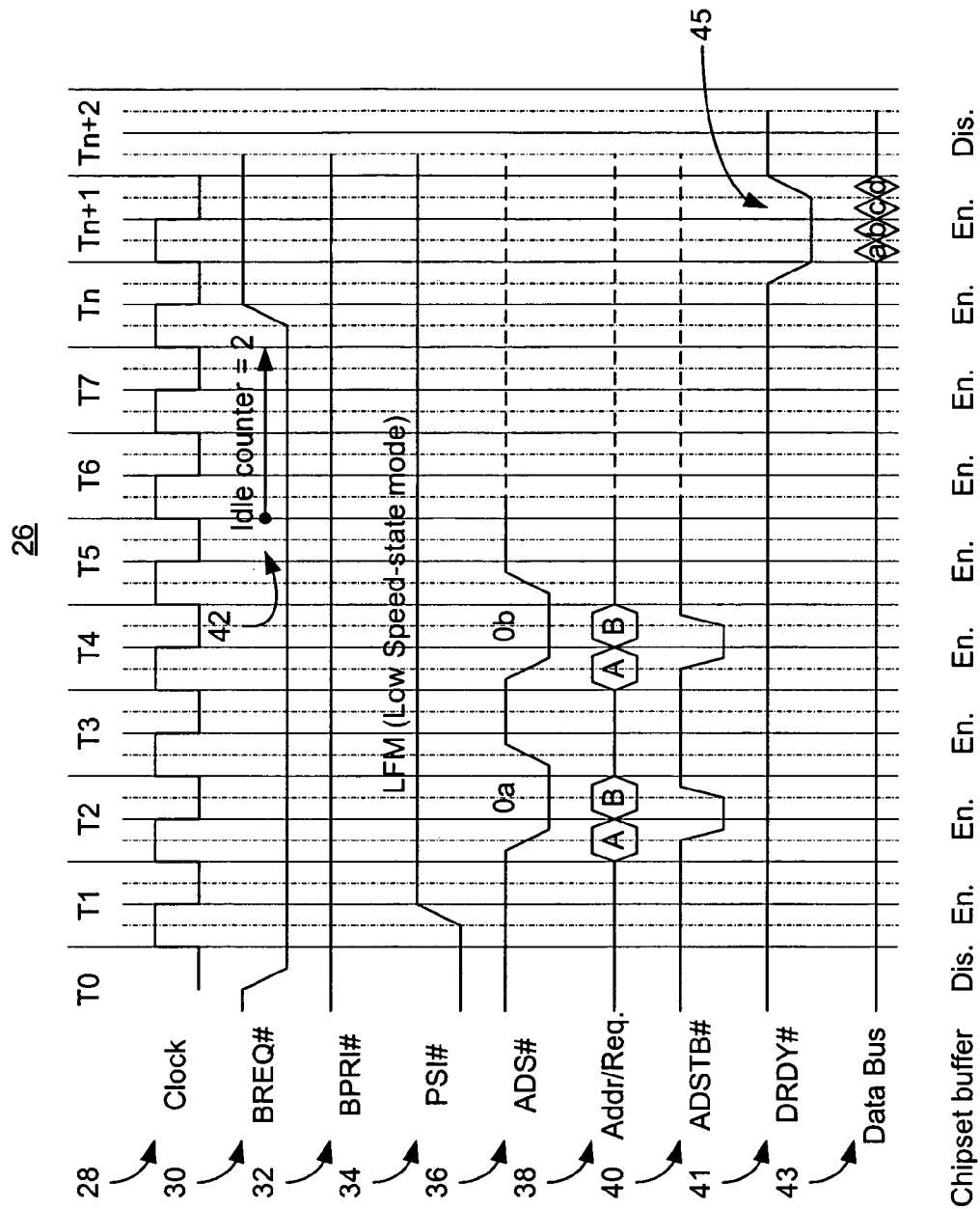
FIGS. 2A and 2B are timing diagrams of examples of input buffer disabling schemes according to first and second embodiments, respectively.

Turning now to FIG. 2A, an example of the signaling for one power management scheme 26 is shown in greater detail. In the illustrated example, a bus clock signal 28 is shown in relation to a bus arbitration signal (BREQ#) 30, a bus priority signal (BPRI#) 32, a power status indicator signal (PSI#) 34, an address strobe common clock signal (ADS#) 36, an address/request signal (Addr/Req.) 38 and an address synchronous strobe signal (ADSTB#) 40. A data ready signal (DRDY#) 41 and data bus signal 43 are also shown. In the illustrated example, the bus arbitration signal 30 is asserted by the processor bus logic during the T0 clock cycle to gain bus ownership in order to communicate with the controller. The illustrated common clock and address strobe signals 36, 40, facilitate the transfer of information via the address/request signal 38 (i.e., "A" and "B") during the T2-T4 clock cycles. In particular, the common clock signal 36 is used to indicate that a new transaction is to be issued to the bus and the asynchronous strobe signal 40 is used to sample the double pump address lines.

The illustrated bus arbitration signal 30 is de-asserted during the Tn clock cycle. The controller input buffers, which were disabled in the TO clock cycle, can be disabled upon completion of the last burst data transfer associated with the DRDY# assertion 45. In particular, although de-assertion of the bus arbitration signal 30 indicates that the processor has completed an issue request, all data transfers related to this request should complete before the input buffers are disabled. Thus, the internal buffers of the controller can become disabled in the illustrated Tn+2 clock cycle. The result can be a substantial reduction in power consumption within the controller.

It should be noted each time the bus arbitration signal 30 is re-asserted, there may be a minimal impact on performance because a re-arbitration may be necessary before the next transaction can take place on the bus. For example, re-arbitration could impose two clocks of additional latency (e.g., T0 and T1 clock cycles in the example shown) on the system. Frequent transitions into and out of the processor-initiated power saving state could therefore cause an undesirable minimum reduction in performance. Accordingly, an idle counter 42 can be used to ensure that the bus has been idle for a sufficient amount of time (i.e., T6 and T7 clock cycles in the example shown) before de-asserting the bus arbitration signal 30. It should also be noted that the idle counter value can programmed to any value (i.e., zero and up) depending upon the circumstances. In this regard, the processor bus logic may need to retrieve the counter value from a programmable memory location such as the basic input/output system (BIOS) erasable programmable read only memory (EPROM) and compare the number of idle clock cycles to the counter value in determining whether to de-assert the bus arbitration signal 30.

The decision whether to de-assert the bus arbitration signal 30 can also be made based on the operating frequency of the processor. In this regard, the processor could be capable of selectively reducing its frequency/voltage during periods of relative inactivity or to otherwise save power. Thus, de-assertion of the bus arbitration signal 30 could be limited to time periods when the operating frequency of the processor is below some frequency threshold.

In one example, a processor can enter a low frequency mode (LFM) in order to achieve greater battery life. If the processor is able to enter such a low frequency mode, it may be desirable to limit the use of the bus arbitration de-assertion to the LFM periods in order to "hide" the potential performance penalty associated with the de-assertion. Simply put, the de-assertion penalty may be negligible in comparison to the performance penalty associated with the LFM. Thus, in the illustrated example, the processor bus logic ensures that the LFM signal 34 is asserted before proceeding with the de-assertion of the bus arbitration signal 30. The frequency at which the power saving activity is activated may be programmable. For example, it is possible to store the value 1.3 GHz, where each time the processor enters a frequency equal to or lower than 1.3 GHz, the power saving message will be asserted. Alternatively, the power saving message could be asserted each time the performance state (e.g., P state) of the processor falls below a predetermined level. The same applies to a plurality of cores/processors where the combined state is evaluated.

Alternatively, the state of the LFM signal 34 could be ignored altogether when deciding whether to de-assert the bus arbitration signal 30. One circumstance in which such an approach may be acceptable could be in the case of a very small computing platform (e.g., handheld personal digital assistant) where battery life may always take priority over performance.

Although not shown, the processor bus logic could further base the decision whether to de-assert the bus arbitration signal 30 on the bus ratio (i.e., the ratio of the processor operating frequency to the bus operating frequency). For example, the processor bus logic could confirm that the bus ratio is below a particular threshold to ensure that the de-assertion related performance loss is not visible. Such a technique could be employed in addition to or instead of the raw frequency check provided by LFM signal 34. If the LFM signal 34 is not used, the bus ratio approach could facilitate acceptable operation even when the processor is in the high frequency mode.

It should also be noted that the bus power signal 32, which may travel from the controller to the processor, can also be de-asserted by the controller in order to effectively disable the input buffers of the processor and achieve even greater power savings.

Figure 2B:
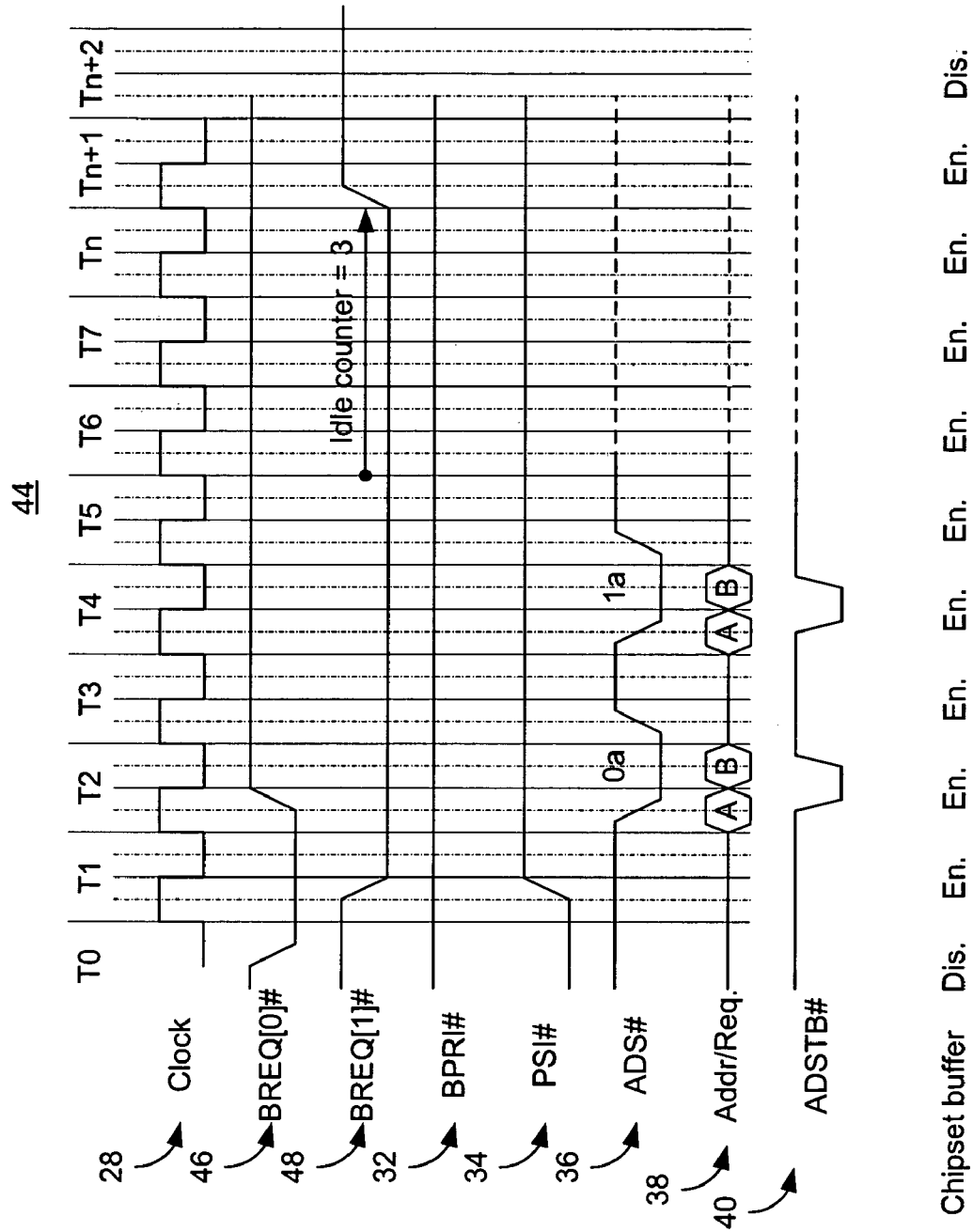

FIG. 2B shows an example of a power management scheme 44 in which the controller supports more than one processor. In this example, a first processor is associated with a first bus arbitration signal (BREQ[0]#) 46 and a second processor is associated with a second bus arbitration signal (BREQ[1]#) 48. The two bus arbitration signals 46, 48 can be ORed together so that the input buffer of the controller is enabled whenever either of the processors is asserting the signal. Thus, in the illustrated example, the controller input buffer is enabled until the Tn+2 clock cycle, where both bus arbitration signals 46, 48 are de-asserted. A multiprocessor bus arbitration protocol can be used to manage the assertion/de-assertion of the signals 46, 48. It can also be seen that in the illustrated example, a counter value of three clock cycles is used so that the last processor to attempt to de-assert its respective bus arbitration signal (i.e., the second processor in the example shown) is forced to wait for the T6 through Tn clock cycles to complete before disabling the controller input buffer via bus arbitration signal 48.

Figure 3:
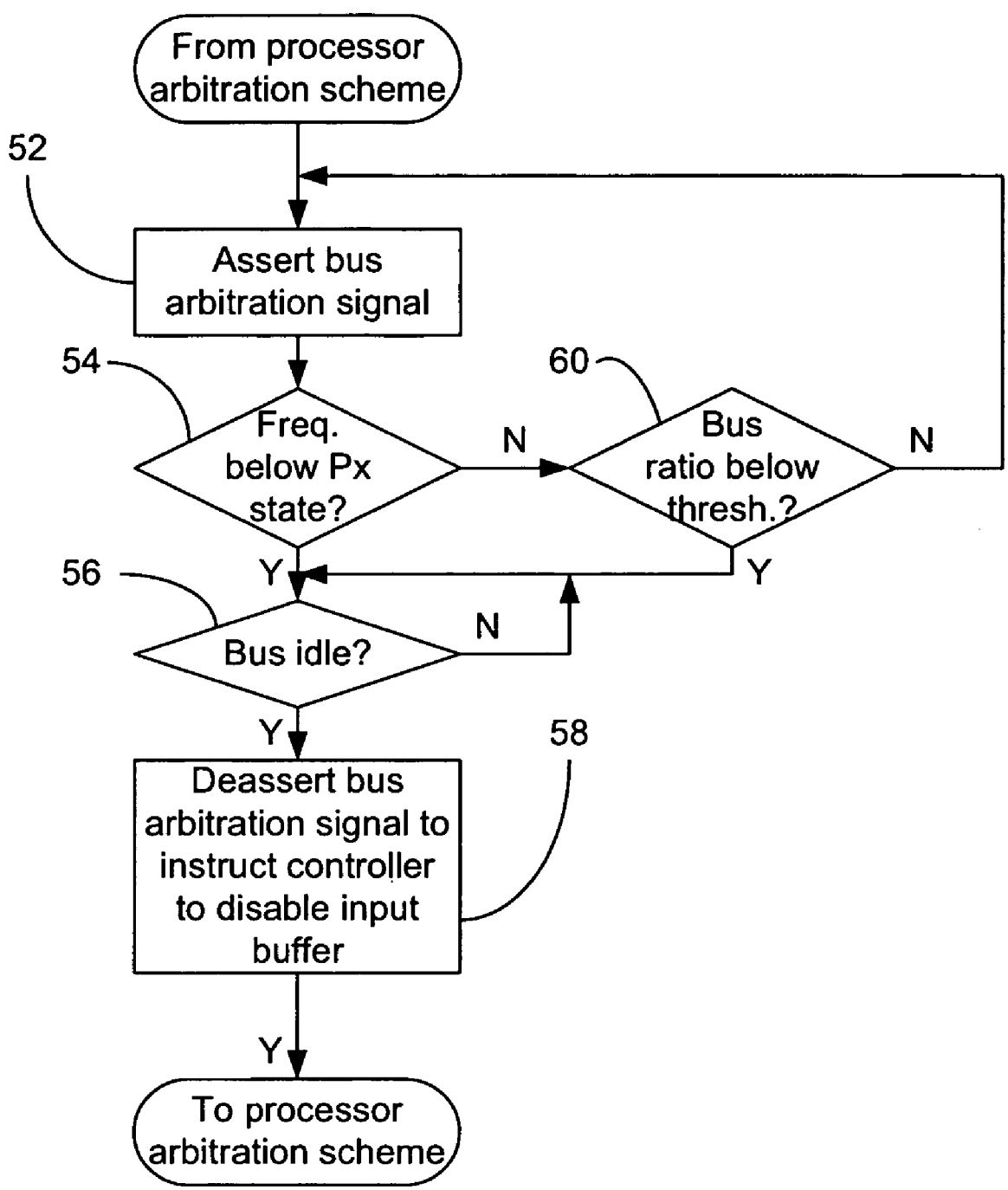
FIG. 3 is a flowchart of an example of a method of power management according to one embodiment.

Turning now to FIG. 3, a method 50 of power management is shown. The method 50 may be implemented as processor bus logic using hardware techniques such as complementary metal oxide semiconductor (CMOS) technology or transistor-transistor logic (TTL), controller firmware, microcode, software techniques, and any combination thereof. In the illustrated example, processing block 52 provides for asserting a bus arbitration signal from a processor toward a controller having a bus arbitration line input and an input buffer. If it is determined at block 54 that the operating frequency of the processor is at or below a frequency threshold (e.g., at or below a particular Advanced Configuration and Power Interface/ACPI Specification, Rev. 3.0, Sep. 2, 2004, Px state; in low frequency mode, etc.), block 56 provides for determining whether a bus disposed between the processor and the controller has been idle for a certain amount of time. As already discussed, the determination at block 56 may involve comparing the number of idle clock cycles to a counter value, which may be retrieved from a programmable memory location. If the bus is sufficiently idle, the bus arbitration signal can be de-asserted at block 58 in order to instruct the controller to disable its input buffer.

If it is determined at block 54 that the operating frequency of the processor is not at or below the frequency threshold, block 60 provides for determining whether the bus ratio is below a certain threshold. For example, it could be determined that if the bus ratio is less than 2:1, the relative processor performance is such that the additional performance loss associated with the de-assertion may be negligible. Thus, if block 60 determines that the bus ratio is below the relevant threshold, a check of the bus idleness can still be conducted at block 56. Otherwise, the process returns to block 52 for re-assertion of the bus arbitration signal.

Figure 4:
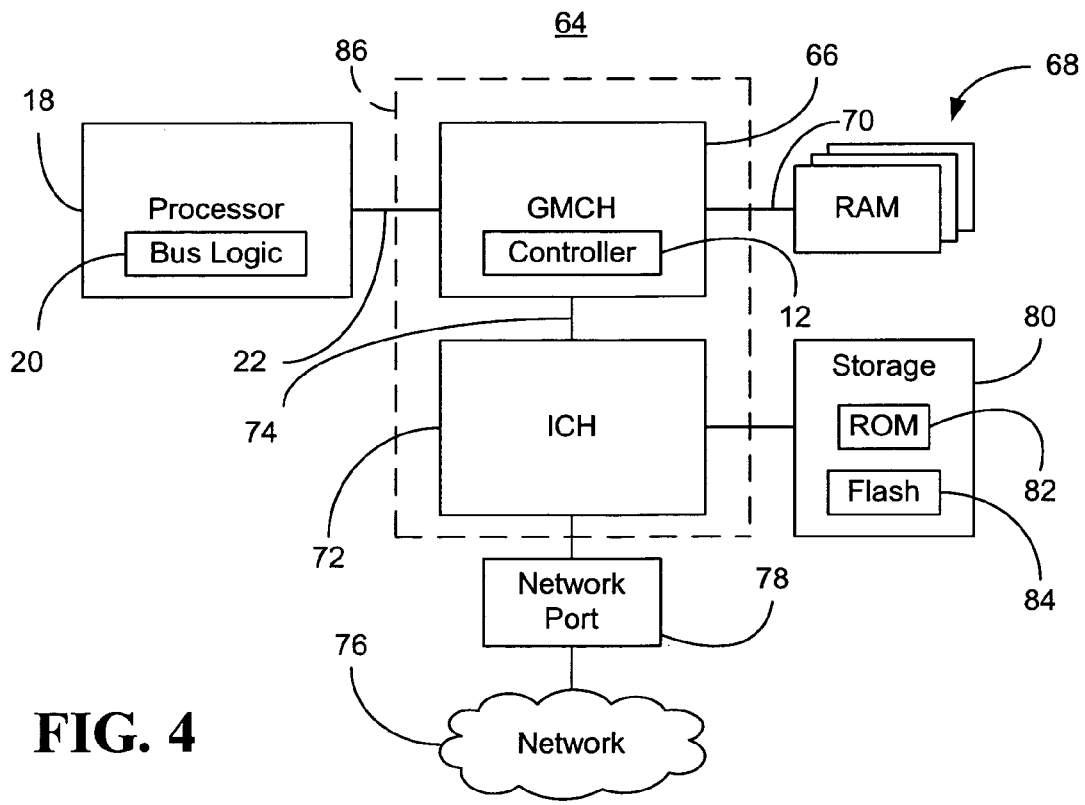
FIG. 4 is a block diagram of an example of a system according to one embodiment.

FIG. 4 shows a computing system 64, which could be part of a server, desktop personal computer (PC), notebook PC, personal digital assistant (PDA), wireless "smart" phone, and so on. The illustrated system 64 has a microprocessor 18, which may have one or more processor cores (not shown), where each core may be fully functional with instruction fetch units, instruction decoders, level one (L1) cache, execution units, and so on. The microprocessor 18 may also include bus logic 20 as already discussed. The microprocessor 18 can communicate with a graphic model and memory controller hub (GMCH) 66, also known as a Northbridge, via a front side bus 22. As already noted, the front side bus 22 could alternatively be replaced by a point-to-point fabric that interconnects each of the components in the system 64. The GMCH 66, which may include a controller 12, can communicate with system random access memory (RAM) 68 via a memory bus 70. In one embodiment, the RAM 68 includes dynamic random access memory (DRAM) modules. The modules of the RAM 68 may be incorporated in to a single inline memory module (SIMM), dual inline memory module (DIMM), small outline DIMM (SODIMM), and so on. The GMCH 66 may also include one or more graphics devices (not shown).

The illustrated GMCH 66 communicates with an I/O controller hub (ICH) 72, also known as a Southbridge, via a hub bus 74. The GMCH 66 and the ICH 72 are sometimes referred to as a chipset 86. The microprocessor 18 may also be operatively connected to a network 76 via a network port 78 through the ICH 72. The ICH 72 may also be coupled to storage 80, which may include a read only memory (ROM) 122, flash memory 84, etc. In one embodiment, the bus logic 20 is configured to selectively assert a bus arbitration signal toward the controller 12 in order to reduce the power consumption of the chipset 86.

As already noted, various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
   a processor having bus logic to issue a power saving message by asserting an arbitration signal on a bus; and
   a controller having power management logic to receive the power saving message via the arbitration signal and to conduct a power saving activity in response to the power saving message by disabling one or more components at the controller.

2. The apparatus of claim 1, wherein the bus logic is to determine whether to issue the power saving message based on an operating frequency of the processor.

3. The apparatus of claim 2, wherein the bus logic is to determine whether to issue the power saving message based on a ratio of the operating frequency of the processor to an operating frequency of a bus disposed between the processor and the controller.

4. The apparatus of claim 2, further including a plurality of processors, the operating frequency to be shared by each of the plurality of processors.

5. The apparatus of claim 1, wherein the bus logic is to determine whether to issue the power saving message based on an idleness of a bus disposed between the processor and the controller.

6. The apparatus of claim 5, wherein the bus logic is to count a number of idle clock cycles on the bus and compare the number of idle clock cycles to a counter value.

7. The apparatus of claim 6, wherein the bus logic is to retrieve the counter value from a programmable memory location.

8. The apparatus of claim 1, wherein the power saving message is to include a de-assertion of a bus arbitration signal.

9. The apparatus of claim 1, wherein the power saving activity is to be selected from a group comprising disabling an internal component of the controller and disabling an external component that is managed by the controller.

10. The apparatus of claim 9, wherein the internal component of the controller is to be selected from a group comprising an input buffer and a functional block.

11. The apparatus of claim 9, wherein the external component is to include a memory device.

12. The apparatus of claim 1, further including a chipset memory controller hub, the memory controller hub including the controller.

13. A method comprising:
   issuing a power saving message from a processor by asserting an arbitration signal on a bus; and
   a controller receiving the power saving message via the arbitration signal and conducting a power saving activity in response to the power saving message by disabling one or more components at the controller.

14. The method of claim 13, further including determining whether to issue the power saving message based on an operating frequency of the processor.

15. The method of claim 14, further including determining whether to issue the power saving message based on a ratio of the operating frequency of the processor to an operating frequency of a bus disposed between the processor and the controller.

16. The method of claim 14, wherein the operating frequency is shared by each of a plurality of processors.

17. The method of claim 13, further including determining whether to issue the power saving message based on an idleness of a bus disposed between the processor and the controller.

18. The method of claim 17, further including: counting a number of idle clock cycles on the bus; and comparing the number of idle clock cycles to a counter value.

19. The method of claim 18, further including retrieving the counter value from a programmable memory location.

20. The method of claim 13, wherein the issuing includes de-asserting a bus arbitration signal.

21. The method of claim 13, wherein the using is selected from a group comprising disabling an internal component of the controller and disabling an external component that is managed by the controller.

22. A system comprising:
   a processor having bus logic to issue a power saving message by asserting an arbitration signal on a bus;
   a chipset, coupled the processor, having power management logic to receive the power saving message via the arbitration signal and conduct a power saving activity in response to the power saving message; and
   a small outline dual inline memory module (SODIMM) coupled to the chipset.

23. The system of claim 22, wherein the bus logic is to determine whether to issue the power saving message based on an operating frequency of the processor.

24. The system of claim 23, wherein the bus logic is to determine whether to issue the power saving message based on a ratio of the operating frequency of the processor to an operating frequency of a bus disposed between the processor and the chipset.

25. The system of claim 22, wherein the bus logic is to determine whether to issue the power saving message based on an idleness of a bus disposed between the processor and the chipset.

26. The system of claim 22, wherein the power saving message is to include a de-assertion of a bus arbitration signal.

27. The system of claim 22, wherein the power saving activity is to be selected from a group comprising disabling an internal component of the controller and disabling an external component that is managed by the controller.

28. A method comprising:
   asserting a bus arbitration signal from a processor toward a controller;
   de-asserting the bus arbitration signal if an operating frequency of the processor is below a threshold and a bus disposed between the processor and the controller is idle for a period of time;
   detecting the de-assertion of a bus arbitration signal; and
   using the controller to conduct a power saving activity in response to the de-assertion of the bus arbitration signal.

29. The method of claim 28, wherein the using includes disabling an internal component of the controller, the internal component being selected from a group comprising an input buffer and a functional block.

30. The method of claim 28, wherein the using includes disabling a memory device that is managed by the controller.

* * * * *